United States Patent
Li (10) Patent No.: US 10,656,471 B2
(45) Date of Patent: May 19, 2020

(54) LIQUID CRYSTAL DISPLAY PANEL AND ITS METHOD OF MANUFACTURE, LIQUID CRYSTAL DISPLAY DEVICE

(71) Applicant: Shenzhen China Star Optoelectronics Technology Co., Ltd., Shenzhen (CN)

(72) Inventor: Qian Li, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/029,676

(22) Filed: Jul. 9, 2018

(65) Prior Publication Data

US 2019/0235292 A1 Aug. 1, 2019

Related U.S. Application Data

(63) Continuation of application No. PCT/CN2018/083310, filed on Apr. 17, 2018.

(30) Foreign Application Priority Data

Jan. 30, 2018 (CN) .......................... 2018 1 0094803

(51) Int. Cl.
*G02F 1/1339* (2006.01)
*G02F 1/1362* (2006.01)
(Continued)

(52) U.S. Cl.
CPC ........ *G02F 1/1339* (2013.01); *G02F 1/13454* (2013.01); *G02F 1/133512* (2013.01);
(Continued)

(58) Field of Classification Search
CPC ............ G02F 1/1339; G02F 1/136286; G02F 1/13454; G02F 1/133512; G02F 1/133617;
(Continued)

(56) References Cited

U.S. PATENT DOCUMENTS

2002/0167634 A1* 11/2002 Watanabe ......... G02F 1/133512
349/153
2004/0165127 A1 8/2004 Lin et al.
(Continued)

FOREIGN PATENT DOCUMENTS

CN 101221316 A 7/2008
CN 104793408 A 7/2015
(Continued)

OTHER PUBLICATIONS

The First Office Action from China patent office in a counterpart Chinese patent Application 201810094803.6, dated Dec. 23, 2019 (8 pages).

*Primary Examiner* — Shan Liu (57) ABSTRACT

The present disclosure discloses a liquid crystal display panel, its method of manufacture and a liquid crystal display device. The panel includes an array substrate, a color filter substrate, a sealant connecting the two substrates, and a liquid crystal between the two substrates; a photoluminescent material is disposed on at least one of the array substrate and the color film substrate corresponding to the sealant, the photoluminescent material is used to emit a second light under the excitation of a first light, the second light is used to solidify the sealant, the photoluminescent material is at least partially disposed on a light passage of the first light. By the above methods, the present disclosure can solve the incomplete solidified problem of the sealant causing by the light is blocked and the sealant cannot be completely irra- (Continued)

diated when the sealant of the existing display panel is solidified.

10 Claims, 4 Drawing Sheets

(51) Int. Cl.
*G02F 1/1345* (2006.01)
*G02F 1/1335* (2006.01)
*G02F 1/13357* (2006.01)

(52) U.S. Cl.
CPC .. *G02F 1/133617* (2013.01); *G02F 1/136286* (2013.01); *G02F 1/133514* (2013.01); *G02F 2202/106* (2013.01); *G02F 2202/108* (2013.01); *G02F 2202/36* (2013.01)

(58) Field of Classification Search
CPC ......... G02F 1/133514; G02F 2202/108; G02F 2202/106; G02F 2202/36; G02F 1/1336; G02F 2001/133607; G02F 2001/133616; G02F 1/133606; G02F 1/133504; G02F 1/0107; G02F 1/1341; G02F 1/161
USPC .............................. 349/61–64, 153, 154, 190
See application file for complete search history.

(56) References Cited

U.S. PATENT DOCUMENTS

| | | | |
|---|---|---|---|
| 2013/0154949 A1* | 6/2013 | Jamshidi Roudbari | G02F 1/1339 345/173 |
| 2016/0116650 A1* | 4/2016 | Jiang | G02B 5/201 359/359 |
| 2016/0370611 A1* | 12/2016 | Jiang | G02F 1/1303 |
| 2017/0139244 A1* | 5/2017 | Zhang | G02F 1/1339 |
| 2017/0146859 A1 | 5/2017 | Llin et al. | |
| 2018/0017817 A1* | 1/2018 | Ren | G02F 1/1339 |
| 2018/0356697 A1* | 12/2018 | Ni | G02F 1/136209 |

FOREIGN PATENT DOCUMENTS

| | | |
|---|---|---|
| CN | 105116629 A | 12/2015 |
| CN | 105511153 A | 4/2016 |
| CN | 106681073 A | 5/2017 |
| CN | 206757245 U | 12/2017 |

\* cited by examiner

LIQUID CRYSTAL DISPLAY PANEL AND ITS METHOD OF MANUFACTURE, LIQUID CRYSTAL DISPLAY DEVICE

CROSS-REFERENCE TO RELATED APPLICATION

This is a continuation of International Application PCT/CN2018/083310, with an international filing date of Apr. 17, 2018, which claims foreign priority of Chinese Patent Application No. 201810094803.6, filed on Jan. 30, 2018 in the State Intellectual Property Office of China, the contents of all of which are hereby incorporated by reference.

TECHNICAL FIELD

The present disclosure relates to liquid crystal display technology, and in particular to a liquid crystal display panel and its method of manufacture, liquid crystal display device.

BACKGROUND

The liquid crystal panel is composed of one and one pixel, each pixel needs a TFT (Thin Film Transistor) switch to control its picture display. The gate circuit lines that control these switches are usually arranged outside the liquid crystal screen.

With the need for narrower LCD frame borders, GOA (Gate Driver on Array) technology is generally used, that is, the width of the frame is effectively reduced by placing the gate driving circuit on the array substrate. In the display panel, the border sealant is usually coated on the CF (color filter) side to reduce the effects of backlight leakage and TFT metal reflection. Therefore, in the border sealant manufacturing process, the curing of the border sealant on the array substrate side is generally used. In such a lighting mode, the phenomenon that the area of the border sealant shielded by the a to circuit lines do not be illuminated occurs, thereby reducing the hardenability of the border sealant.

SUMMARY

The technical problem solved by the present disclosure is to provide a liquid crystal display panel and its method of manufacture, liquid crystal display device, which can solve the problem that in the existing display panel, when the sealant is cured, the light is blocked, and the sealant cannot be completely irradiated, resulting in incomplete solidifying of the sealant.

In order to solve the technical problem mentioned above, the present disclosure provides a liquid crystal display device including a backlight source; and a liquid crystal display panel including an array substrate, a color filter substrate, a sealant connecting the array substrate and the color filter substrate, and a liquid crystal between the array substrate and the color filter substrate; a photoluminescent material is disposed on at least one of the array substrate and the color film substrate corresponding to the sealant, the photoluminescent material is configured to emit a second light under an excitation of a first light, the second light is configured to solidify the sealant, the photoluminescent material is at least partially disposed on a light passage of the first light; the photoluminescent material is a quantum dot film, an excitation wavelength of the photoluminescent material is 300-400 nm, and an emission wavelength of the photoluminescent material is 350-500 nm.

In order to solve the technical problem mentioned above, the present disclosure provides a liquid crystal display panel including an array substrate, a color filter substrate, a sealant connecting the array substrate and the color filter substrate, and a liquid crystal between the array substrate and the color filter substrate; a photoluminescent material is disposed on at least one of the array substrate and the color film substrate corresponding to the sealant, the photoluminescent material is configured to emit a second light under the excitation of a first light, the second light is configured to solidify the sealant, the photoluminescent material is at least partially disposed on a light passage of the first light.

In order to solve the technical problem mentioned above, the present disclosure provides a method of manufacturing a liquid crystal display panel, the method including: providing an array substrate and a color film substrate; forming a photoluminescent material on at least one of the array substrate and the color film substrate corresponding to a sealant area; forming a sealant on at least one of the array substrate and the color film substrate corresponding to the sealant area; arranging the array substrate and the color filter substrate to form the liquid crystal display panel; illuminating the sealant area by a first light to excite the photoluminescence material produces a second light to solidify the sealant.

The benefit effects of the present disclosure are: different from the related art, the liquid crystal display panel of the present disclosure including an array substrate, a color filter substrate, a sealant connecting the array substrate and the color filter substrate, and a liquid crystal between the array substrate and the color filter substrate; a photoluminescent material is disposed on at least one of the array substrate and the color film substrate corresponding to the sealant, the photoluminescent material is configured to emit a second light under the excitation of a first light, the second light is configured to solidify the sealant, the photoluminescent material is at least partially disposed on a light passage of the first light. By the above methods, to avoid the problem that in the case where the sealant area on the array substrate is provided with circuit lines, the circuit lines blocks the light so that the light cannot completely irradiate the sealant, so that the is not completely solidified and the array substrate and the color filter substrate are not firmly bonded.

BRIEF DESCRIPTION OF THE DRAWINGS

In order to more clearly describe the technical solutions in the embodiments of the present disclosure, the drawings used in the description of the embodiments will be briefly described below. Obviously, the drawings in the following description are only some embodiments of the present disclosure. For those of ordinary skill in the art, other drawings may also be obtained based on these drawings without any creative work. among them.

DETAILED DESCRIPTION

The following will clearly and completely describe the technical solutions in the embodiments of the present disclosure with reference to the accompanying drawings in the embodiments of the present disclosure. It is to be understood that the specific embodiments described herein are only used to explain the present disclosure and are not intended to limit the present disclosure. It should also be noted that for ease of description, only some but not all of the structures related to the present disclosure are shown in the drawings. All other embodiments obtained by a person of ordinary skill in the art based on the embodiments of the present disclosure without making creative efforts shall fall within the protection scope of the present disclosure.

The terms "first", "second", and the like in the present disclosure are used to distinguish different objects and are not used to describe a specific sequence. Further, the terms "include" and "have" and any variants thereof are intended to cover non-exclusive inclusions. For example, a process, method, system, product, or device that comprises a series of steps or units is not limited to the listed steps or units, but may optionally include steps or units that are not listed, or alternatively may also include other steps or units inherent to these processes, methods, products, or equipment.

References herein to "an embodiment" means that a particular feature, structure, or characteristic described in connection with an embodiment can be included in at least one embodiment of the present disclosure. The appearances of such phrases in various places in the specification are not necessarily all referring to the same embodiment, nor are separate or alternative embodiments mutually exclusive of other embodiments. It will be understood by those skilled in the art, both explicitly and implicitly, that the embodiments described herein can be combined with other embodiments.

Figure 1:
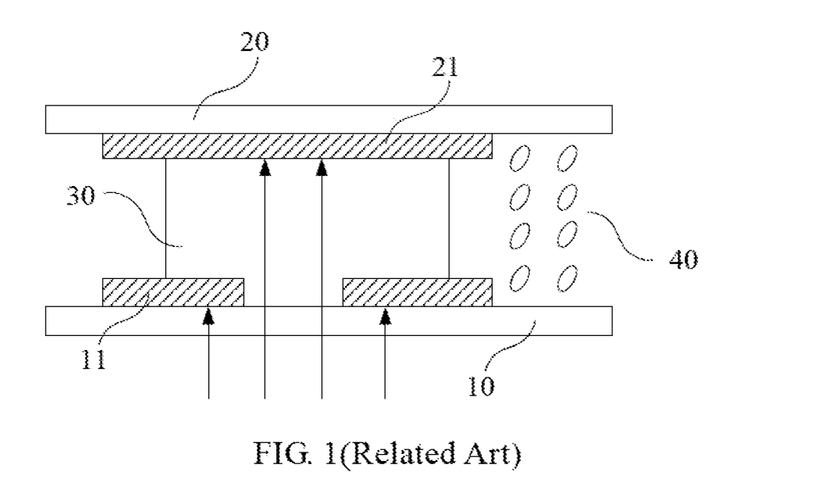
FIG. 1 is a schematic structural diagram of a liquid crystal display panel in the related art.

Referring to FIG. 1, FIG. 1 is a schematic structural diagram of a liquid crystal display panel in the related art. The liquid crystal display panel includes an array substrate 10, a color filter substrate 20, a sealant 30 connecting the array substrate 10 and the color filter substrate 20, and a liquid crystal 40 between the array substrate 10 and the color filter substrate 20.

In general, the manufacturing process is as follows: firstly separately manufacturing the array substrate 10 and the color filter substrate 20, and then coating the sealant 30 on a specific area of at least one of the array substrate 10 and the color filter substrate 20; then assembling the array substrate 10 and the color filter substrate 20, the array substrate 10 and the color filter substrate 20 are adhered by the sealant 30; then filling the liquid crystal 40 between the array substrate 10 and the color filter substrate 20 through a through hole (not shown) in the sealant 30; finally, solidifying the sealant 30.

In particular, the sealant 30 is generally to be solidified by irradiating with ultraviolet (UV). Since in the display panel, the sealant 30 is generally coated on the black matrix 21 on a side of the color filter substrate 20, then the effect of backlight leakage and metal reflection of the TFT can be reduced. Therefore, UV light is generally incident from the side of the array substrate 10.

It can be understood that, in order to achieve the narrow border of the display panel, the existing GOA type panel is set with circuit lines 11 for gate driving function, the circuit lines are disposed on the position corresponding to the sealant 30 of the array substrate 10, for example, the circuit lines may be gate lines. In order to save costs, the gate lines generally are not transparent conductive lines, but made of metals such as aluminum, titanium, nickel, or their alloys, which do not have transparency. Therefore, when the UV light is irradiated, part of the UV light is shielded by the circuit lines 11, and the sealant 30 cannot be completely irradiated with the UV light, so that the sealant 30 is not completely solidified, and the adhesion between the array substrate 10 and the color filter substrate 20 is insecure.

Figure 2:
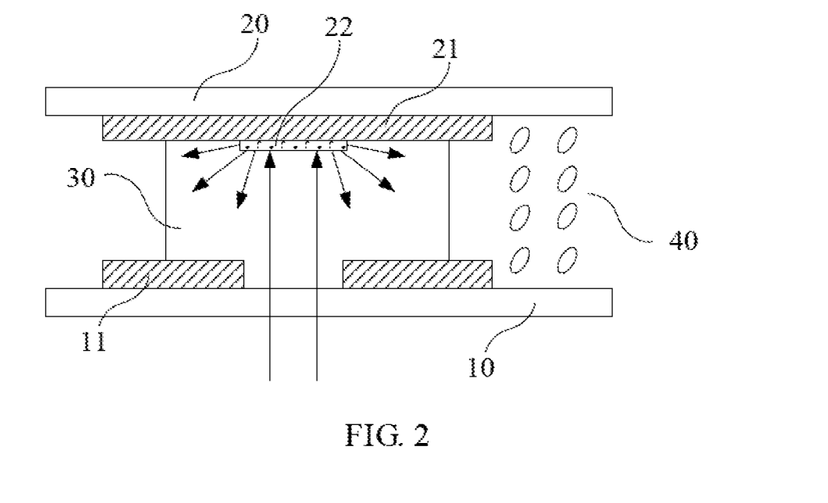
FIG. 2 is a SCHEMATIC structural diagram of an embodiment of a liquid crystal display panel provided by the present disclosure.

Referring to FIG. 2, FIG. 2 is a schematic structural diagram of an embodiment of a liquid crystal display panel provided by the present disclosure. The liquid crystal display panel includes an array substrate 10, a color filter substrate 20, a sealant 30 connecting the array substrate 10 and the color filter substrate 20, and a liquid crystal 40 between the array substrate 10 and the color filter substrate 20.

A photoluminescent material 22 is disposed on at least one of the array substrate 10 and the color film substrate 20 corresponding to the sealant 30. The photoluminescent material 22 is used to emit a second light under the excitation of a first light, and the second light is used to solidify the sealant 30, the photoluminescent material 22 is at least partially disposed on the light path of the first light.

Optionally, in this embodiment, the photoluminescent material 22 may be disposed on a black matrix 21 on the color filter substrate 20. The photoluminescent material 22 at least partially corresponds to the gap between the circuit lines 11 on the array substrate 10.

Specifically, the photoluminescent material 22 may be a thin film that covers the surface of the black matrix 21, has a width smaller than the width of the sealant 30, and at least partially corresponds to a gap between the circuit lines 11.

In one case, the width of the photoluminescent substance 22 is equal to the width of the gap between the circuit lines 11, and in the other case, the width of the photoluminescent substance 22 may be larger or smaller than the width of the gap between the circuit lines 11.

Optionally, in this embodiment, the photoluminescent material 22 is a quantum dot film. Specifically, the quantum dot solution may be spot-coated on the surface of the black matrix 21 by means of ink jet or the like to form a quantum dot film. For example, the photoluminescent material 22 is a thin film made of a quantum material such as ZnO (zinc oxide), CdSe (cadmium selenide), of CdS (cadmium sulfide).

Optionally, in another embodiment, the photoluminescent material 22 may also be a fluorescent material.

In the above two embodiments, the material of the quantum dot material or the fluorescent material is selected with an excitation wavelength of 300-400 nm and an emission wavelength of 350-500 nm. That is, the first light has a wavelength of 300-400 nm, and the second light has a wavelength of 350-500 nm.

Specifically, when the first light is irradiated onto the photoluminescent substance 22 through the gap between the circuit lines 11, the photoluminescent substance 22 emits the second light under the excitation of the first light, the direction of emission of the second light is scattered, and other areas on the sealant 30 that are not irradiated with the first light can be irradiated with the second light to be solidified.

In addition, it can be understood that the photoluminescent material 22 in this embodiment may also be a reflective material, such as a diffuse reflection film. Since the Wavelength of the light absorbed and reflected by the diffuse reflection film is equal, when the diffuse reflection filth is used, the wavelength of the incident first light may be determined at cording to the wavelength of light required for solidifying the sealant 30.

Figure 3:
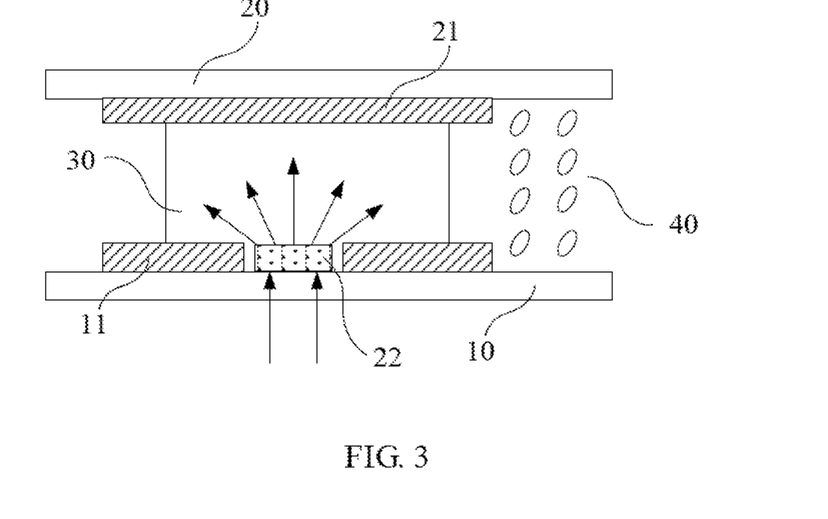
FIG. 3 is a schematic structural diagram of another embodiment of a liquid crystal display panel provided by the present disclosure.

Referring to FIG. 3, FIG. 3 is a schematic structural diagram of another embodiment of a liquid crystal display panel provided by the present disclosure. The liquid crystal display panel includes an array substrate 10, a color film substrate 20, and a sealant 30 connecting the array substrate 10 and the color filter substrate 20, and a liquid crystal 40 between the array substrate 10 and the color filter substrate 20.

A photoluminescent material 22 is disposed on at least one of the array substrate 10 and the color film substrate 20 corresponding to the sealant 30. The photoluminescent material 22 is used to emit a second light under the excitation of a first light, and the second light is used to solidify the sealant 30, the photoluminescent material 22 is at least partially disposed on the light path of the first light.

Optionally, in the present embodiment, the photoluminescent material 22 may be disposed at a gap between the circuit lines 11 on the array substrate 10.

The width of the photoluminescent material 22 may be equal to the width of the gap between the circuit lines 11, or may be smaller than the width of the gap between the circuit lines 11.

Specifically, when the first light is irradiated on the photoluminescent substance 22, the photoluminescent substance 22 emits the second light under the excitation of the first light. The direction of emission of the second light is scattered, and the sealant 30 can be irradiated to be solidified.

Figure 4:
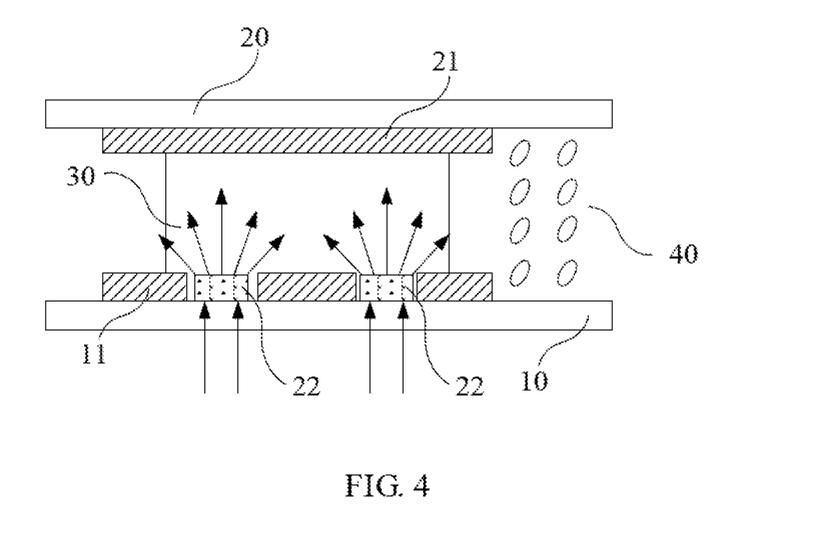
FIG. 4 is a schematic structural diagram of still another embodiment of a liquid crystal display panel provided by the present disclosure.

Referring to FIG. 4, FIG. 4 is a schematic structural diagram of still another embodiment of a liquid crystal display panel provided by the present disclosure. The liquid crystal display panel includes an array substrate 10, a color filter substrate 20, a sealant 30 connecting the array substrate 10 and the color filter substrate 20, and a liquid crystal 40 between the array substrate 10 and the color filter substrate 20.

It can be understood that the circuit lines 11 disposed on the array substrate 10 are arranged in an array. Therefore, in the present embodiment, the photoluminescent material 22 may be disposed between every two adjacent circuit lines 11. The solidification of the sealant 30 is guaranteed.

Figure 5:
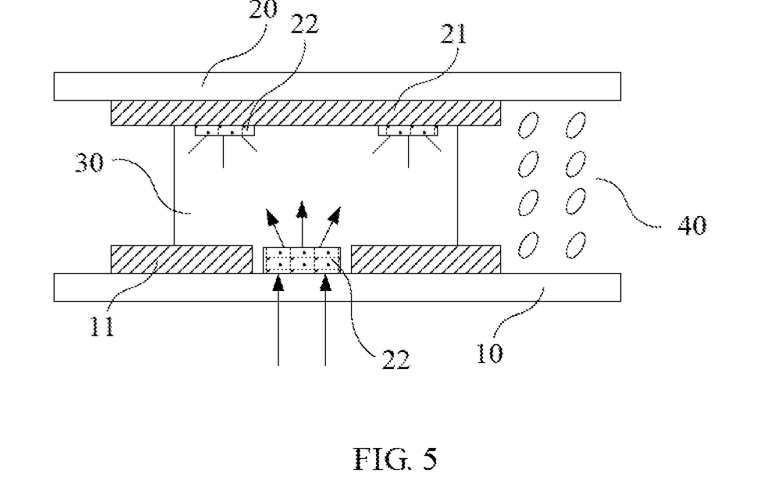
FIG. 5 is a schematic structural diagram of still another embodiment of a liquid crystal display panel provided by the present disclosure.

Referring to FIG. 5, FIG. 5 is a schematic structural diagram of still another embodiment of a liquid crystal display panel provided by the present disclosure. The liquid crystal display panel includes an array substrate 10, a color filter substrate 20, a sealant 30 connecting the array substrate 10 and the color filter substrate 20, and a liquid crystal 40 between the array substrate 10 and the color filter substrate 20.

The photoluminescent material 22 is disposed on the array substrate 10 and the color filter substrate 20 corresponding to the sealant 30. The photoluminescent material 22 is used to emit the second light under the excitation of the first light, and the second light is used to solidify the sealant 30, and the photoluminescent material 22 is at least partially disposed on the light path of the first light.

On the array substrate 10, the photoluminescent substance 22 is disposed at a gap between the circuit lines 11 on the array substrate 10. On the color filter substrate 20, the photoluminescent substance 22 may not be disposed corresponding to the gap between the circuit lines 11.

Specifically, when the first light is irradiated on the photoluminescent material 22 on the side of the array substrate 10, the photoluminescent material 22 emits the second light under the excitation of the first light. The emission direction of the second light is scattered, and then it is irradiated onto the photoluminescent substance 22 on the side of the color filter substrate 20, and after the second excitation and scattering, the third light is emitted again. Thus, the second light and the third light may irradiate the sealant 30 to be solidified.

Different from the related art, liquid crystal display panel of the present disclosure including an array substrate, a color filter substrate, a sealant connecting the array substrate and the color filter substrate, and a liquid crystal between the array substrate and the color filter substrate; a photoluminescent material is disposed on at least one of the array substrate and the color film substrate corresponding to the sealant, the photoluminescent material is configured to emit a second light under the excitation of a first light, the second light is configured to solidify the sealant, the photoluminescent material is at least partially disposed on a light passage of the first light. By the above methods, to avoid the problem that in the case where the sealant area on the array substrate is provided with circuit lines, the circuit lines blocks the light so that the light cannot completely irradiate the sealant, so that the is not completely solidified and the array substrate and the color filter substrate are not firmly bonded.

Figure 6:
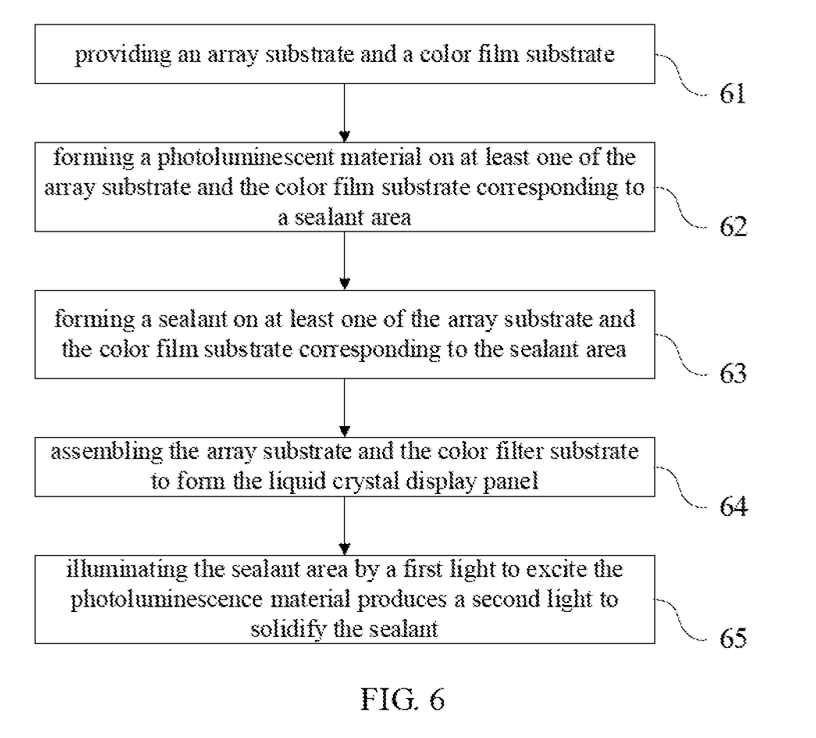
FIG. 6 is a schematic flowchart of an embodiment of a method of manufacturing a liquid crystal display panel provided by the present disclosure.

Referring to FIG. 6, FIG. 6 is a schematic flowchart of an embodiment of a method of manufacturing a liquid crystal display panel provided by the present disclosure. The method includes:

Block 61: Providing an array substrate and a color film substrate.

Block 62: Forming a photoluminescent material on at least one of the array substrate and the color film substrate corresponding to a sealant area.

Taking the photoluminescent material be a quantum dot film as an example, the block 62 may specifically be that spot-coating the quantum dot material on at least one of the array substrate and the color film substrate at locations corresponding to the sealant area. The quantum dot material may be ZnO.

Block 63: Forming a sealant on at least one of the array substrate and the color film substrate corresponding to the sealant area.

In block 63, forming the sealant can be performed by spot coating, ink jet, or the like.

Block 64, assembling the array substrate and the color filter substrate to form the liquid crystal display panel.

Specifically, through holes may be reserved on the sealant, and liquid crystals may be filled into the interior after the assembling.

Block 65: Illuminating the sealant area by a first light to excite the photoluminescence material produces a second light to solidify the sealant.

The light here generally uses ultraviolet light. In one embodiment, the light wavelength is 300-400 nm, and the wavelength of the second light generated by the photoluminescent material is 350-500 nm.

Figure 7:
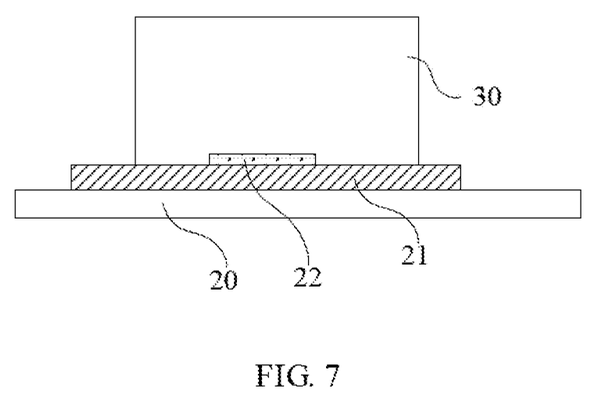
FIG. 7 is a schematic structural diagram of an embodiment of a method of manufacturing a liquid crystal display panel provided by the present disclosure.

In an embodiment, taking the color film substrate as an example, as shown in FIG. 7, a black matrix 21 is formed on the color film substrate 20, and a photoluminescent material 22 is formed on the black matrix 21 at the position corresponding to the sealant area. The sealant 30 covering the photoluminescent substance 21 is formed on the film substrate 20 at a position corresponding to the sealant area. Then, as shown in FIG. 2, the array substrate 10 and the color filter substrate 20 are assembled to form a liquid crystal display panel.

Figure 8:
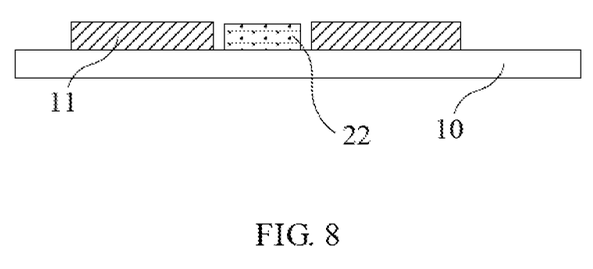
FIG. 8 is another schematic structural diagram of an embodiment of a method of manufacturing a liquid crystal display panel provided by the present disclosure.

In an embodiment, taking a color filter substrate as an example, as shown in FIG. 8, a photoluminescent material 22 is disposed on the gap between the circuit lines 11 of the encapsulant area on the array substrate 10. Then, as shown in FIG. 3, the array substrate 10 and the color filter substrate 20 are assembled to form a liquid crystal display panel.

It can be understood that, in the present embodiment, the methods of manufacturing the array substrate and the color filter substrate may be the manufacturing methods in the related art. Optionally, in an embodiment, the array substrate may include a base substrate, a buffer layer, a gate, a gate insulating layer, a TFT functional layer, a dielectric layer, a planar layer, and a common electrode layer which are stack setting. The substrate may include a base substrate, a color filter, and a pixel electrode which are stack setting.

In addition, in other embodiments, a COA (Color Filter On Array) type panel may also be used, which is not limited herein.

Figure 9:
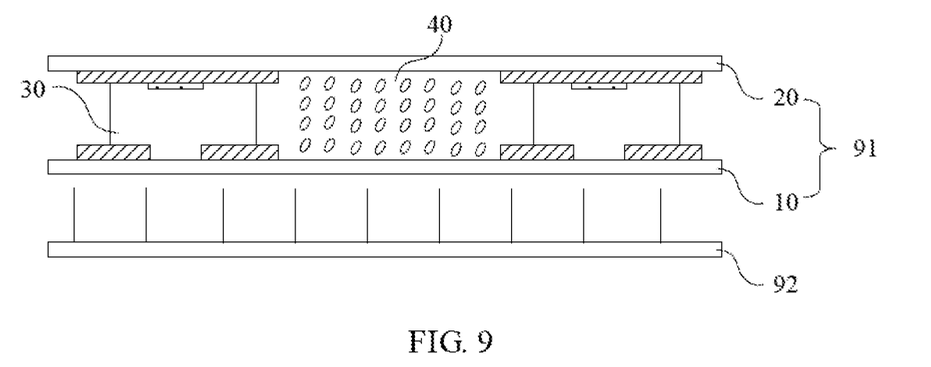
FIG. 9 is a schematic structural diagram of an embodiment of a liquid crystal display device provided by the present disclosure.

Referring to FIG. 9, FIG. 9 is a schematic structural diagram of an embodiment of a liquid crystal display device provided by the present disclosure. The liquid crystal display device includes a liquid crystal display panel 91 and a backlight 92.

The liquid crystal display panel 91 may be the display panel provided in any of the above embodiments shown in FIG. 2 to FIG. 5, or may be the display panel produced by the manufacturing method shown in FIG. 6. The structure and the manufacturing flow are similar, not repeat here again.

Different from the related art, the liquid crystal display device provided in this embodiment includes a liquid crystal display panel and a backlight. The liquid crystal display panel includes an array substrate, a color filter substrate, a sealant connecting the array substrate and the color filter substrate, and a liquid crystal between the array substrate and the color filter substrate; a photoluminescent material is disposed on at least one of the array substrate and the color film substrate corresponding to the sealant, the photoluminescent material is configured to emit a second light under the excitation of a first light, the second light is configured to solidify the sealant, the photoluminescent material is at least partially disposed on a light passage of the first light. By the above methods, to avoid the problem that in the case where the sealant area on the array substrate is provided with circuit lines, the circuit lines blocks the light so that the light cannot completely irradiate the sealant, so that the is not completely solidified and the array substrate and the color filter substrate are not firmly bonded.

The foregoing descriptions are merely implementation manners of the present disclosure, and therefore do not limit the scope of patents of the present disclosure. Any equivalent structure or equivalent process transformation using the description of the present disclosure and the accompanying drawings may be directly or indirectly applied to other related technologies. The same applies in the field of patent protection of this disclosure.

What is claimed is:

1. A liquid crystal display device, comprising:
   a backlight source; and
   a liquid crystal display panel comprising an array substrate, a color filter substrate, a sealant connecting the array substrate and the color filter substrate, and a liquid crystal between the array substrate and the color filter substrate;
   wherein a photoluminescent material is disposed on at least one of the array substrate and the color film substrate corresponding to the sealant, the photoluminescent material is configured to emit a second light under an excitation of a first light, the second light is configured to solidify the sealant, the photoluminescent material is at least partially disposed on a light passage of the first light;
   wherein the photoluminescent material is a quantum dot film, an excitation wavelength of the photoluminescent material is 300-400 nm, and an emission wavelength of the photoluminescent material is 350-500 nm;
   wherein the photoluminescent material comprises at least one first photoluminescent part and at least one second photoluminescent part, each first photoluminescent part is disposed at a corresponding gap between circuit lines on the array substrate, a first width of each first photoluminescent part is smaller than a second width of the corresponding gap between the circuit lines.

2. The liquid crystal display device according to claim 1, wherein a width of the quantum dot film is less than a width of the sealant.

3. The liquid crystal display device according to claim 1, wherein the at least one second photoluminescent part is at least partially disposed on a position of the color filter substrate, the position corresponds to a gap between the circuit lines on the array substrate.

4. The liquid crystal display device according to claim 1, wherein the photoluminescent material is the quantum dot film made of a quantum material, the quantum material comprises Zinc Oxide, Cadmium Selenide, or Cadmium Sulfide.

5. A liquid crystal display panel, comprising:
   an array substrate, a color filter substrate, a sealant connecting the array substrate and the color filter substrate, and a liquid crystal between the array substrate and the color filter substrate;
   wherein a photoluminescent material is disposed on at least one of the array substrate and the color film substrate corresponding to the sealant, the photoluminescent material is configured to emit a second light under an excitation of a first light, the second light is configured to solidify the sealant, the photoluminescent material is at least partially disposed on a light passage of the first light;
   wherein the photoluminescent material comprises at least one first photoluminescent part and at least one second photoluminescent part, each first photoluminescent part is disposed at a corresponding gap between circuit lines on the array substrate, a first width of each first photoluminescent part is smaller than a second width of the corresponding gap between the circuit lines.

6. The liquid crystal display panel according to claim 5, wherein the photoluminescent material is a quantum dot film.

7. The liquid crystal display panel according to claim 6, wherein a width of the quantum dot film is less than a width of the sealant.

8. The liquid crystal display panel according to claim 6, wherein the photoluminescent material is the quantum dot film made of a quantum material, the quantum material comprises Zinc Oxide, Cadmium Selenide, or Cadmium Sulfide.

9. The liquid crystal display panel according to claim 5, wherein the at least one second photoluminescent part is at least partially disposed on a position of the color filter substrate, the position corresponds to a gap between circuit lines on the array substrate.

10. The liquid crystal display panel according to claim 5, wherein an excitation wavelength of the photoluminescent material is 300-400 nm, and an emission wavelength of the photoluminescent material is 350-500 nm.

\* \* \* \* \*